United States Patent
Numa

(10) Patent No.: US 9,080,307 B2
(45) Date of Patent: Jul. 14, 2015

(54) WORK VEHICLE AND WHEEL LOADER

(71) Applicant: KOMATSU LTD., Tokyo (JP)

(72) Inventor: Yasutaka Numa, Komatsu (JP)

(73) Assignee: KOMATSU LTD., Tokyo (JP)

( * ) Notice: Subject to any disclaimer, the term of this patent is extended or adjusted under 35 U.S.C. 154(b) by 4 days.

(21) Appl. No.: 14/126,501

(22) PCT Filed: Mar. 26, 2013

(86) PCT No.: PCT/JP2013/058706
§ 371 (c)(1),
(2) Date: Dec. 16, 2013

(87) PCT Pub. No.: WO2014/155505
PCT Pub. Date: Oct. 2, 2014

(65) Prior Publication Data
US 2015/0075892 A1    Mar. 19, 2015

(51) Int. Cl.
*B60K 11/04* (2006.01)
*B60K 13/04* (2006.01)
(Continued)

(52) U.S. Cl.
CPC ............... *E02F 9/0866* (2013.01); *B60K 11/04* (2013.01); *B60K 11/06* (2013.01); *B60K 13/04* (2013.01); *E02F 9/0891* (2013.01); *F01N 3/035* (2013.01); *F01N 3/2066* (2013.01); *F01P 5/06* (2013.01); *B60Y 2200/415* (2013.01); *F01N 2260/022* (2013.01); *F01N 2260/20* (2013.01);
(Continued)

(58) Field of Classification Search
CPC ........ B60K 11/02; B60K 11/04; B60K 11/08; B60K 13/04; F01P 5/06; F01N 13/009
See application file for complete search history.

(56) References Cited

U.S. PATENT DOCUMENTS 5,692,467 A * 12/1997 Sahm et al. ............... 123/198 E
5,816,350 A * 10/1998 Akira et al. ................. 180/68.1
(Continued)

FOREIGN PATENT DOCUMENTS

| JP | 8-276755 A | 10/1996 |
|----|------------|---------|
| JP | 10-338036 A | 12/1998 |

(Continued)

OTHER PUBLICATIONS

The Japanese Office Action for the corresponding Japanese application No. 2013-521320, issued on Jul. 29, 2014.
(Continued)

*Primary Examiner* — Frank Vanaman
(74) *Attorney, Agent, or Firm* — Global IP Counselors, LLP

(57) ABSTRACT

A work vehicle includes an engine, an exhaust gas post-processing device, an engine room, a cooling fan, a cooling unit and a first exhaust pipe. The exhaust gas post-processing device includes a diesel particulate filtering device, a selective catalyst reduction device, a connecting pipe connecting the diesel particulate filtering device and the selective catalyst reduction device, and an injection device configured and arranged to inject a reducing agent into the connecting pipe. The engine room accommodates the engine and the exhaust gas post-processing device. The cooling fan is configured to suck in air from one side and to exhaust air from another side to produce an air flow. The cooling unit is disposed on the one side of the cooling fan. The first exhaust pipe has one end arranged to suck in air around the injection device and another end located between the cooling fan and the cooling unit.

16 Claims, 11 Drawing Sheets

(51) Int. Cl.
  *E02F 9/08* (2006.01)
  *F01P 5/06* (2006.01)
  *B60K 11/06* (2006.01)
  *F01N 3/20* (2006.01)
  *F01N 3/035* (2006.01)

(52) U.S. Cl.
  CPC ......... *F01N2590/08* (2013.01); *F01N 2610/11* (2013.01); *F01N 2610/1493* (2013.01)

(56) References Cited

U.S. PATENT DOCUMENTS

| | | | | |
|---|---|---|---|---|
| 6,302,066 | B1* | 10/2001 | Steinmann | 123/41.49 |
| 2001/0007292 | A1* | 7/2001 | Yabf | 180/68.1 |
| 2005/0279548 | A1* | 12/2005 | Kurtz et al. | 180/68.6 |
| 2010/0031644 | A1* | 2/2010 | Keane et al. | 60/295 |

FOREIGN PATENT DOCUMENTS

| | | | |
|---|---|---|---|
| JP | 2004-142597 | A | 5/2004 |
| JP | 2005-212547 | A | 8/2005 |
| JP | 2005-297644 | A | 10/2005 |
| JP | 2007-283801 | A | 11/2007 |
| JP | 2007-321647 | A | 12/2007 |
| JP | 2008-232089 | A | 10/2008 |
| JP | 2009-133228 | A | 6/2009 |
| JP | 2011-140853 | A | 7/2011 |
| JP | 2013-11109 | A | 1/2013 |

OTHER PUBLICATIONS

International Search Report for PCT/JP2013/058706, issued on Jun. 11, 2013.

* cited by examiner

WORK VEHICLE AND WHEEL LOADER

CROSS-REFERENCE TO RELATED APPLICATIONS

This application is a U.S. National stage application of International Application No. PCT/JP2013/058706, filed on Mar. 26, 2013.

BACKGROUND

1. Field of the Invention

The present invention relates to a work vehicle and a wheel loader.

2. Background Information

A wheel loader includes an engine room containing an engine to the rear of a cab (Japanese Laid-Open Patent Publication No. H8-276755). Recently, exhaust gas post-processing devices have been mounted on wheel loaders for processing exhaust gas from the engine. The exhaust gas post-processing device includes mainly a diesel particulate filtering device and is usually contained inside the engine room.

A hydraulic excavator described in Japanese Laid-open Patent Publication No. 2011-140853 is provided with a nitrogen oxide purifying device as a selective catalyst reduction device as the exhaust gas post-processing device. These exhaust gas post-processing devices are typically disposed above the engine to be provided in the exhaust gas path.

SUMMARY

As described above, while the diesel particulate filter is used as the exhaust gas post-processing device, the provision of a selective catalyst reduction device in addition to the diesel particulate filter in the wheel loader is considered to further purify the exhaust gas. In this case, an injection device injects the reducing agent into the exhaust gas flowing inside a connecting pipe that connects the diesel particulate filtering device and the selective catalyst reduction device. As a result, the nitrogen oxides in the exhaust gas exhausted from the engine are reduced to nitrogen.

However, there is a problem that since the diesel particulate filtering device and the selective catalyst reduction device produce heat while operating, the heat from the devices causes the injection device to become hot thus causing sealing material and the like of the injection device to degrade. Furthermore, Urea aqueous is generally used as the reducing agent to be injected by the injection device. The urea aqueous changes to ammonia when heated. Since ammonia has very strong alkalinity, there is a problem that the durability of the injection device and the like is reduced. This type of problem is not limited to wheel loaders, and also may occur in other work vehicles.

An object of the present invention is to prevent a rise in the temperature of the injection device.

(1) A work vehicle according to a first aspect of the present invention is equipped with an engine, an exhaust gas post-processing device, an engine room, a cooling fan, a cooling unit, and a first exhaust pipe. The exhaust gas post-processing device includes a diesel particulate filtering device, a selective catalyst reduction device, a connecting pipe, and an injection device. The connecting pipe connects the diesel particulate filtering device and the selective catalyst reduction device. The injection device injects a reducing agent into the connecting pipe. The engine room accommodates the engine and the exhaust gas post-processing device. The cooling fan sucks in air from one side and exhausts air from another side to produce an air flow. The cooling unit is disposed on the one side of the cooling fan. The first exhaust pipe has one end and another end. The one end of the first exhaust pipe sucks in air around the injection device. The another end of the first exhaust pipe is located between the cooling fan and the cooling unit.

According to this configuration, the another end of the first exhaust pipe is located between the cooling unit and the cooling fan which is a region of negative pressure when the cooling fan is operating. As a result, the first exhaust pipe acts to suck in the air around the injection device from the one end and exhaust the air from the another end. Consequently, the area around the injection device in the engine room has negative pressure, and the air taken in from outside of the engine room flows into the area around the injection device. As a result, the injection device is cooled by the cooling air that flows from the outside toward the one end of the first exhaust pipe.

(2) The work vehicle preferably is further equipped with a partitioning member. The partitioning member includes a first partition part and a second partition part. The first partition part is disposed between the injection device and the diesel particulate filtering device. The second partition part is disposed between the injection device and the selective catalyst reduction device.

According to this configuration, the injection device is at least covered by the partitioning member on the diesel particulate filtering device side and the selective catalyst reduction device side. As a result, the one end of the first exhaust pipe is able to suck in air around the injection device efficiently and accordingly is able to further cool the injection device. Further, since the first partition part of the partitioning member is disposed between the injection device and the diesel particulate filtering device, radiant heat radiating from the diesel particulate filtering device toward the injection device can be blocked by the first partition part. According to this configuration, a rise in the temperature of the injection device due to radiant heat from the diesel particulate filtering device can be prevented. Furthermore, since the second partition part of the partitioning member is disposed between the injection device and the selective catalyst reduction device, radiant heat radiating from the selective catalyst reduction device toward the injection device can be blocked by the second partition part. Accordingly, a rise in the temperature of the injection device due to radiant heat from the selective catalyst reduction device can be prevented.

(3) The one end of the first exhaust pipe is preferably located above an attachment part of the injection device to the connecting pipe. According to this configuration, the vicinity of the injection device can be cooled more effectively.

(4) The one end of the first exhaust pipe is preferably located in an accommodating space defined by the first partition part and the second partition part. According to this configuration, the one end of the first exhaust pipe is able to more effectively suck in air around the injection device since the injection device is disposed inside the accommodating space.

(5) The work vehicle preferably is further equipped with a second exhaust pipe. The second exhaust pipe has one end that is located above the connecting pipe inside the engine room, and another end that is located between the cooling fan and the cooling unit. According to this configuration, the another end of the second exhaust pipe is located between the cooling unit and the cooling fan which is a region of negative pressure when the cooling fan is operating. As a result, the second exhaust pipe acts to suck air inside the engine room from the one end and exhaust the air from the another end. Consequently, hot air inside the engine room can be exhausted to the outside.

(6) The connecting pipe is preferably disposed so that a longitudinal direction thereof is aligned in the vehicle width direction, and the injection device is disposed on a first side of the connecting pipe as seen from the rear.

According to this configuration, the injection device is disposed between the connecting pipe and an vehicle cover. As a result, the area around the injection device is covered by the connecting pipe and the vehicle cover in addition to the abovementioned partitioning member. Consequently, the first exhaust pipe is able to suck in the air around the injection device from the one end more effectively to allow for more cooling of the injection device.

(7) The injection device preferably injects the reducing agent at an upstream side of the exhaust gas flowing inside the connecting pipe. According to this configuration, the reducing agent can be sufficiently mixed with the exhaust gas inside the connecting pipe.

(8) The diesel particulate filtering device and the selective catalyst reduction device preferably are disposed with the longitudinal directions thereof aligned in the vehicle width direction.

(9) The injection device is preferably disposed between the diesel particulate filtering device and the selective catalyst reduction device in the front-back direction, and the partitioning member further includes a third partition part disposed above the injection device.

According to this configuration, the injection device is covered by the partitioning member in the front, in the rear, and on top. Consequently, the first exhaust pipe is able to suck in the air around the injection device from the one end more effectively to allow for improved cooling efficiency of the injection device.

(10) The work vehicle preferably further includes a top plate that defines an upper plane of the engine room. The exhaust gas post-processing device is disposed above the engine and the top plate has a first ventilation part that includes a plurality of through-holes.

According to this configuration, due to the first exhaust pipe sucking in air around the injection device, outside air can enter the injection device through the first ventilation part and the injection device can be cooled by air from outside.

(11) The top plate preferably further has a sloping part having a height that descends toward the rear. The first ventilation part is formed in the sloping part.

According to this configuration, since mainly the rear part of the top plate of the engine room is provided with the sloping part having a height that descends toward the rear, the visibility to the rear can be assured while the top plate of the engine room is high. Since the first ventilation part is formed in the sloping part, the occupied surface area of the first ventilation part can be made wider than if the first ventilation part is formed in a horizontal part and the intrusion of rainwater can be suppressed.

(12) The sloping part of the top plate preferably defines a rear part upper plane of the engine room. The top plate has a flat part that extends horizontally from the front edge of the sloping part toward the front and defines a front part upper plane of the engine room. According to this configuration, the capacity of the engine room is increased by the amount in which the flat part projects upward.

(13) Preferably, the top plate further includes a pair of side wall parts that extend downward from both side edges of the flat part and the sloping part. The side wall parts include a second ventilation part having a plurality of through-holes.

According to this configuration, since the top plate has the second ventilation part in addition to the first ventilation part, air is able to flow more smoothly between the inside and the outside of the engine room. As a result, the injection device can be cooled more effectively.

(14) Preferably, the through-holes of the second ventilation part have eave parts. According to this configuration, water from rain and the like can be prevented from entering the engine room through the second ventilation part.

(15) The work vehicle preferably is equipped with a cooling room and a partition wall. The cooling room is disposed to the rear of the engine room and accommodates a cooling unit. The partition wall separates the engine room and the cooling room.

(16) A wheel loader according to a second aspect of the present invention is equipped with an engine, an exhaust gas post-processing device, an engine room, a cooling room, a partition wall, a cooling fan, and a first exhaust pipe. The exhaust gas post-processing device includes a diesel particulate filtering device, a selective catalyst reduction device, a connecting pipe, and an injection device. The connecting pipe connects the diesel particulate filtering device and the selective catalyst reduction device. The injection device injects a reducing agent into the connecting pipe. The engine room accommodates the engine and the exhaust gas post-processing device. The cooling room is disposed to the rear of the engine room and accommodates a cooling unit. The partition wall separates the engine room and the cooling room. The cooling fan is disposed to the rear of the cooling unit in the cooling room and exhausts air inside the cooling room to the rear. The first exhaust pipe has one end and another end. The one end of the first exhaust pipe sucks in air around the injection device. The another end of the first exhaust pipe is located between the cooling fan and the cooling unit.

According to this configuration, the another end of the first exhaust pipe is located between the cooling unit and the cooling fan which is a region of negative pressure when the cooling fan is operating. As a result, the first exhaust pipe acts to suck in the air around the injection device from the one end and exhaust the air from the another end. Consequently, the area around the injection device in the engine room has negative pressure, and air taken in from outside of the engine room flows around the injection device. As a result, the injection device is cooled by the cooling air that flows from the outside toward the one end of the first exhaust pipe.

According to the present invention, a rise in temperature of the injection device can be prevented.

DETAILED DESCRIPTION OF EMBODIMENTS

Figure 1:
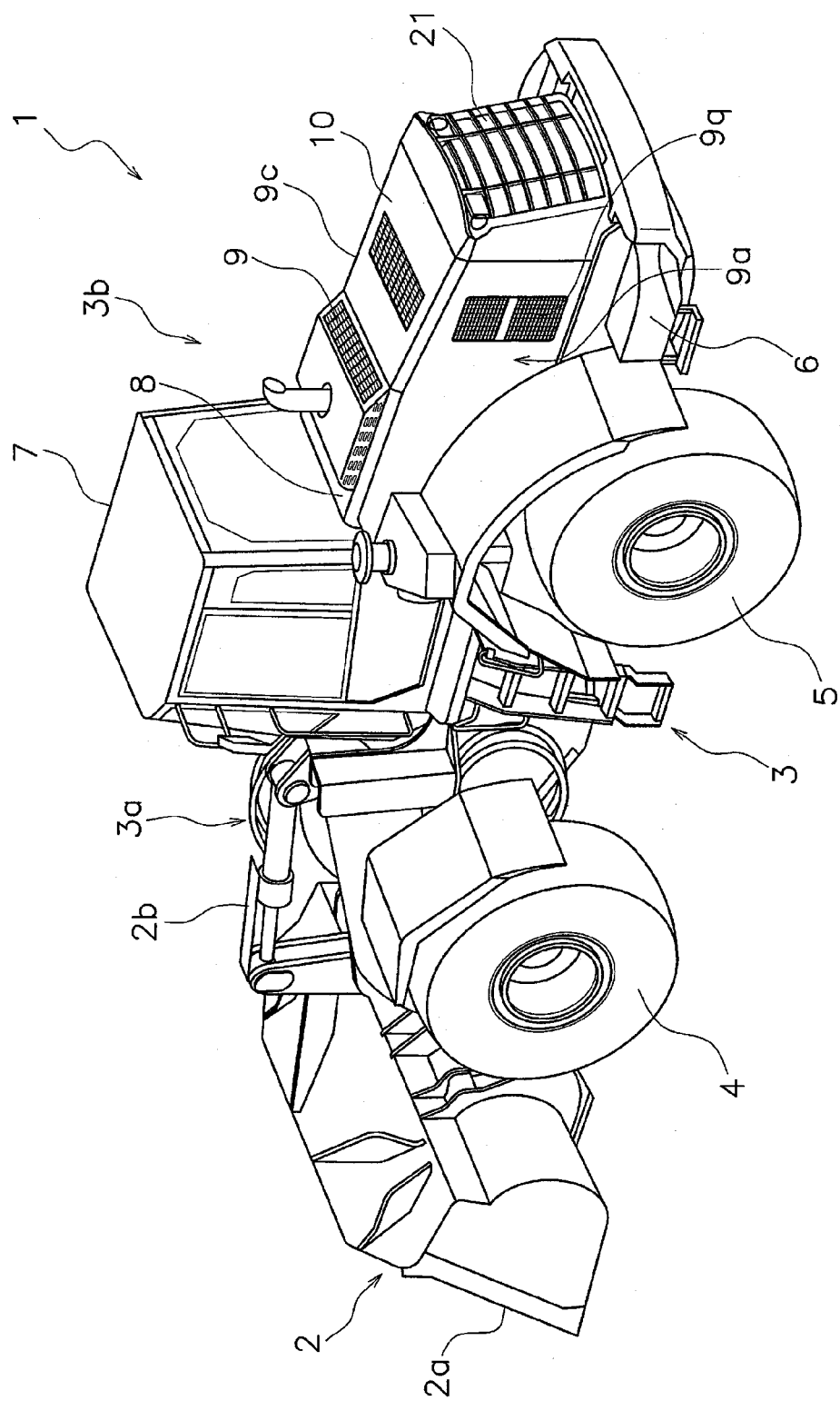
FIG. 1 is a perspective view of the wheel loader as seen from the left rear.

An embodiment of a wheel loader according to the present invention will be explained below with reference to the drawings. FIG. 1 is a perspective external view of a wheel loader 1 as seen from the left rear. In the following explanation, "front" and "rear" refer to the front and the rear of a vehicle body 3. In the following explanation, "right," "left," "up," and "down" indicate directions relative to a state of looking forward from the operating cabin, and "vehicle width direction" and "crosswise direction" have the same meaning. Further, "width" signifies a length in the crosswise direction.

As illustrated in FIG. 1, the wheel loader 1 includes working equipment 2, the vehicle body 3, front wheels 4, and rear wheels 5. The wheel loader 1 is capable of traveling due to the rotation of the front wheels 4 and the rear wheels 5, and desired work can be conducted using the working equipment 2.

The working equipment 2 is a mechanism driven by operating fluid pressurized by a pump, and is disposed at the front of the vehicle body 3. The working equipment 2 includes a bucket 2a, a boom (not shown), a lift cylinder (not shown), and a bucket cylinder 2b. The bucket 2a is attached to the tip of the boom. The boom is a member for lifting the bucket 2a and is mounted at the front part of a belowmentioned front vehicle body 3a. The lift cylinder drives the boom with pressure oil discharged from a working equipment pump. The bucket cylinder 2b drives the bucket 2a with pressure oil discharged from the working equipment pump.

The vehicle body 3 includes the front vehicle body 3a and a rear vehicle body 3b. The front vehicle body 3a and the rear vehicle body 3b are coupled to each other in a manner that allows swinging in the crosswise direction. The working equipment 2 and the front wheels 4 are provided on the front vehicle body 3a, and the rear wheels 5 are provided on the rear vehicle body 3b.

The rear vehicle body 3b includes a rear frame 6, a cab 7, an operating fluid tank 8, an engine room 9, a cooling room 10, and a cooling fan 11. The rear frame 6 is a frame that constitutes the entire shape of the rear vehicle body 3b, and supports the rear wheels 5, the cab 7, the operating fluid tank 8, an engine 12 (see FIG. 2), and a cooling unit 18 (see FIG. 2).

An operating cabin is provided inside the cab 7, and various operating members and an operating panel are provided inside the cab 7. The operating fluid tank 8 is disposed to the rear of the cab 7, and a plurality of hydraulic pumps (not shown) are disposed below the operating fluid tank 8. Operating fluid for driving the working equipment 2 and the like is accumulated in the operating fluid tank 8, and the operating fluid is supplied to the working equipment 2 and the like by the hydraulic pumps.

Figure 2:
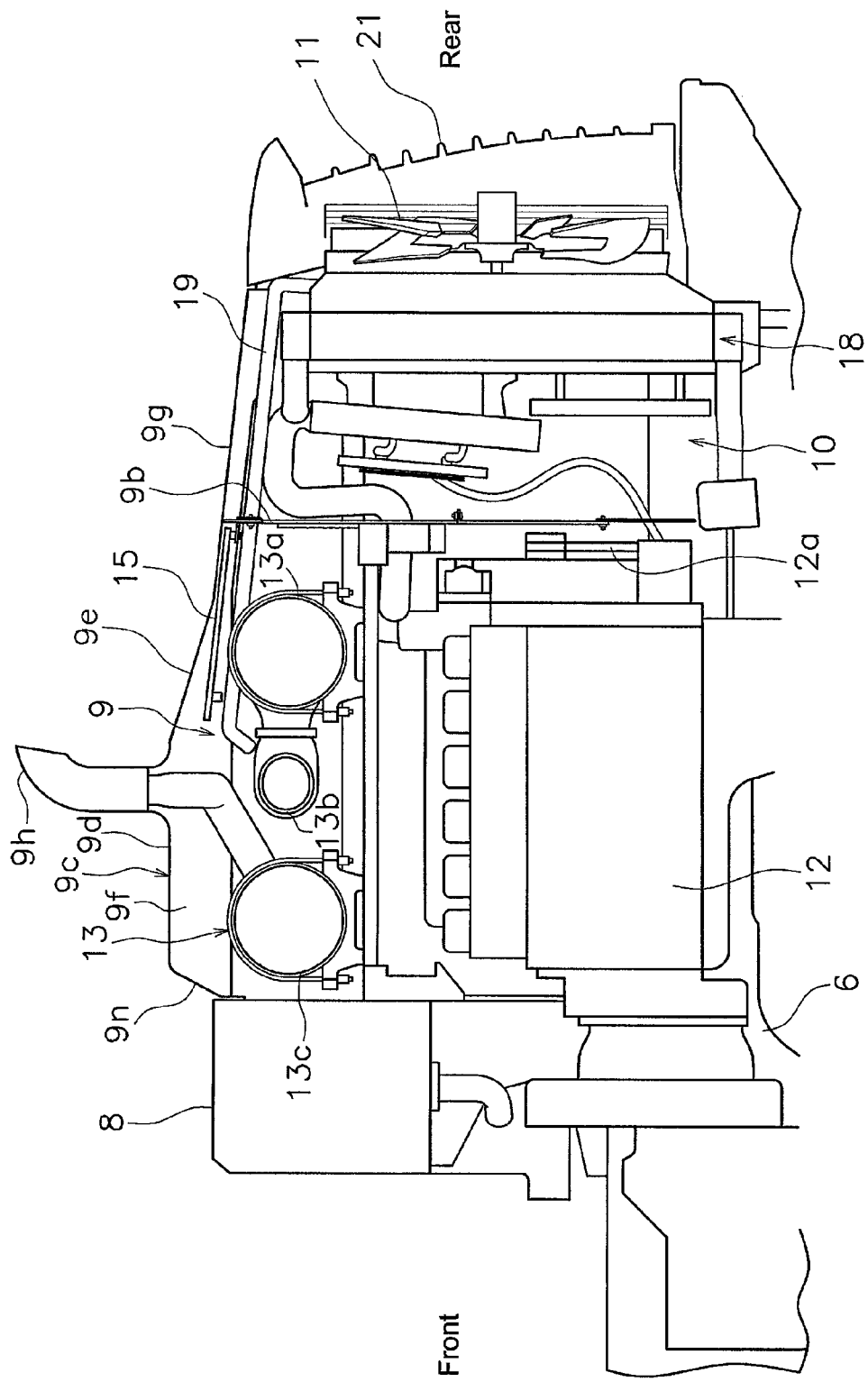
FIG. 2 is a side cross-section of the rear vehicle body as seen from the left side.

FIG. 2 is a side cross-section of the rear vehicle body 3b as seen from the left rear. As illustrated in FIG. 2, the engine room 9 is disposed to the rear of the operating fluid tank 8, and has a front plane defined by the operating fluid tank 8, side planes defined by a vehicle cover 9a (see FIG. 1), a rear plane defined by a partition wall 9b, and an upper plane defined by a top plate 9c.

The engine room 9 accommodates the engine 12 and an exhaust gas post-processing device 13. The engine room 9 further accommodates a belt 12a and the like for transmitting torque from the engine 12 to auxiliary equipment. The engine 12 is disposed in a lower part of the engine room 9 and is an engine in which the crankshaft extends in the front-back direction, that is, a so-called vertical mounted engine.

Figure 3:
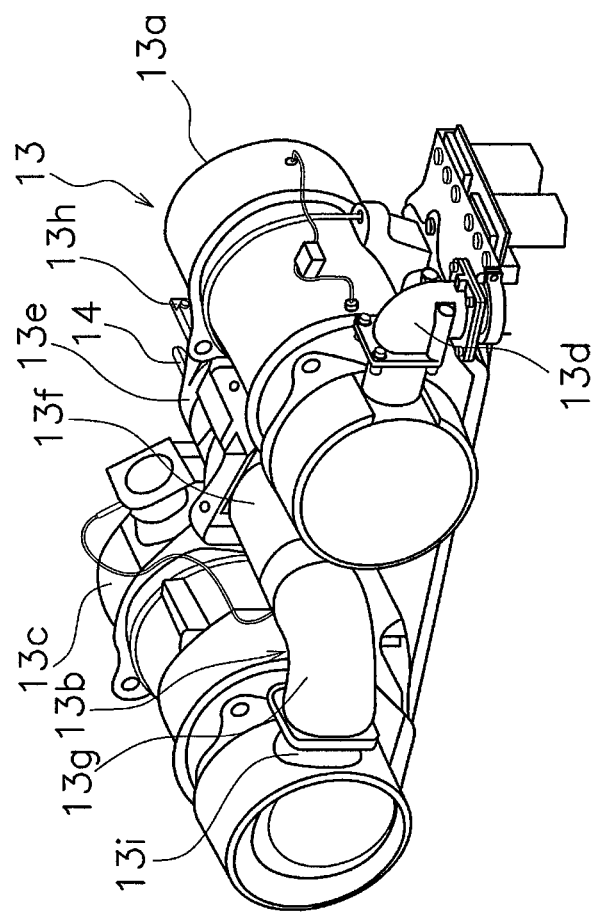
FIG. 3 is a perspective view of the exhaust gas post-processing device as seen from the left rear.

The exhaust gas post-processing device 13 accommodated in the engine room 9 is disposed in an upper part of the engine room 9. Specifically, the exhaust gas post-processing device 13 is disposed above the engine 12. FIG. 3 is a perspective view of the exhaust gas post-processing device 13 as seen from the left rear. As illustrated in FIG. 3, the exhaust gas post-processing device 13 includes, in order of the flow of the exhaust gas, a diesel particulate filtering device 13a, a connecting pipe 13b, and a selective catalyst reduction device 13c. An injection device 14 is attached to the connecting pipe 13b.

The diesel particulate filtering device 13a is coupled to the engine 12 via a pipe 13d, and treats exhaust gas emitted from the engine 12. Specifically, the diesel particulate filtering device 13a is a device that collects, in a filter, particulate matter such as soot in the exhaust gas emitted from the engine 12. The diesel particulate filtering device 13a burns the collected particulate matter with a heater provided with the filter. The diesel particulate filtering device 13a is mounted on a supporting member and the like attached to the rear frame 6.

The connecting pipe 13b connects the diesel particulate filtering device 13a and the selective catalyst reduction device 13c. The connecting pipe 13b has a first bend section 13e, a linear section 13f, and a second bend section 13g, and the entire connecting pipe 13b forms an S shape. The first bend section 13e is connected to an exhaust gas outlet 13h of the diesel particulate filtering device 13a, and the second bend section 13g is connected to an exhaust gas inlet 13i of the selective catalyst reduction device 13c. The linear section 13f extends between the first bend section 13e and the second bend section 13g. The longitudinal direction of the connecting pipe 13b is disposed so as to be aligned in the vehicle width direction. The direction in which the linear section 13b extends is the longitudinal direction of the connecting pipe 13b.

The injection device 14 is disposed on the right side (example of a first side) of the connecting pipe 13b. That is, the injection device 14 is attached to the right side surface of the first bend section 13e. The injection device 14 is a device that injects a urea aqueous solution, which is fed from a urea aqueous solution tank (not shown) disposed on the outside of the engine room 9 and through a urea aqueous solution pipe 14a (see FIG. 4), into the connecting pipe 13b in order to mix the urea aqueous solution into the exhaust gas as a reducing agent. The mixed urea aqueous solution is hydrolyzed to become ammonia, and the ammonia is fed with the exhaust gas through the connecting pipe 13b to the selective catalyst reduction device 13c.

The selective catalyst reduction device 13c is a device that uses the urea aqueous solution from the urea water injection device 14 as the reducing agent to purify by reduction the nitrogen oxides in the exhaust gas. The selective catalyst reduction device 13c is mounted on a supporting member and the like in the same way as the diesel particulate filtering device 13a.

The diesel particulate filtering device 13a and the selective catalyst reduction device 13c are disposed parallel to each other. Specifically, the diesel particulate filtering device 13a and the selective catalyst reduction device 13c are both substantially cylindrical. The direction that the center axes of the diesel particulate filtering device 13a and the selective catalyst reduction device 13c extends is the longitudinal direction of the diesel particulate filtering device 13a and the selective catalyst reduction device 13c. The longitudinal direction of the devices extends substantially parallel to each other in the crosswise direction. The linear section 13f of the connecting pipe 13b is also substantially cylindrical and the longitudinal direction extends in the crosswise direction as described above. Specifically, the center axis of the linear section 13f of the connecting pipe 13b is substantially parallel to the center axes of the diesel particulate filtering device 13a and the selective catalyst reduction device 13c.

Figure 4:
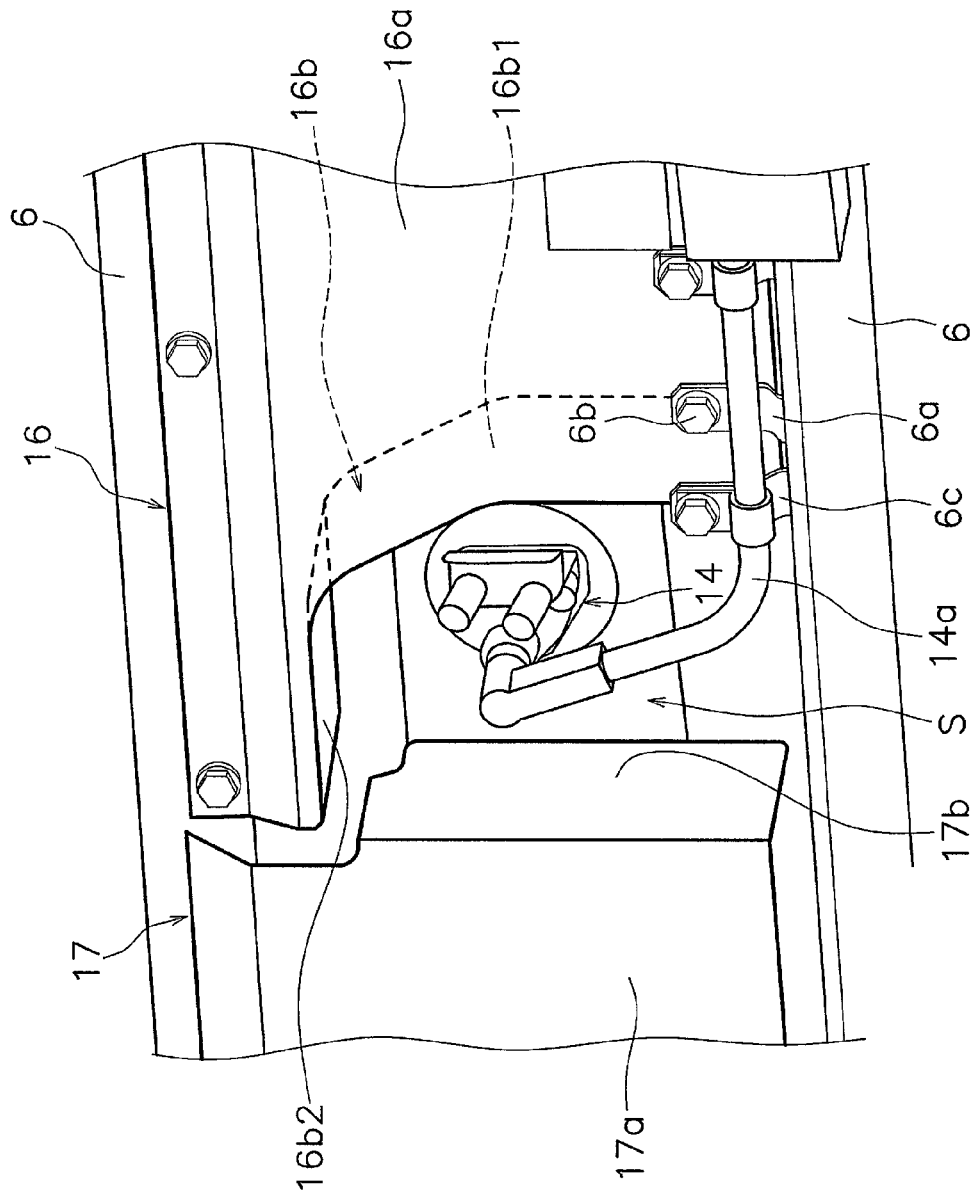
FIG. 4 is a perspective view of a detail around the injection device as seen from the right front.
Figure 5:
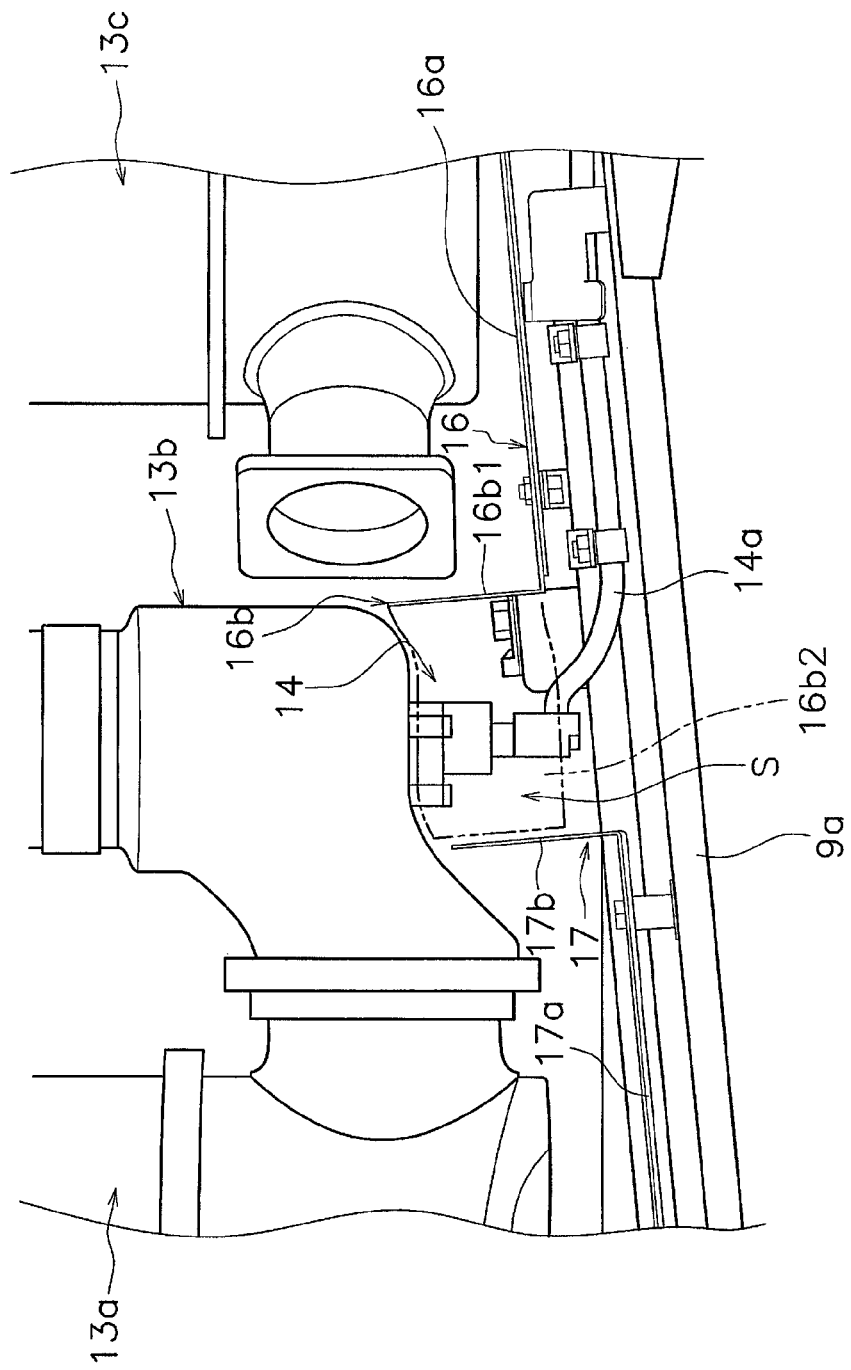
FIG. 5 is a plan view of the detail around the injection device.

FIG. 4 is a perspective view of a detail around the injection device 14 as seen from the right front, and FIG. 5 is a plan view of the detail around the injection device 14. As illustrated in FIGS. 4 and 5, a partitioning member is disposed so as to cover the injection device 14 in the front, the rear, and on the top. The partitioning member includes a first partition plate 16 and a second partition plate 17. The first partition plate 16 and the second partition plate 17 are disposed in a row in the front-back direction. The first partition plate 16 is disposed in front of the second partition plate 17. A partition plate is divided into two to constitute the first partition plate 16 and the second partition plate 17, and an interval between the first partition plate 16 and the second partition plate 17 is provided to create a gap for pipes and the like to pass through.

The first partition plate 16 has a base part 16a and a peripheral wall part 16b, and is fixed to the rear frame 6 using a mounting bracket 6a and bolts 6b. The first partition plate 16 has heat shielding properties and is formed, for example, by a steel plate treated with a heat resistant coating. The base part 16a of the first partition plate 16 is a plate that extends in the front-back direction from the front edge part of the engine room 9 to near the injection device 14, and has a substantially rectangular shape. A rear edge part of the base part 16a is cut into a fan shape so that the right side surface of the injection device 14 is exposed when the vehicle cover 9a is removed. That is, the base part 16a does not extend to the side of the injection device 14.

The base part 16a is disposed between the selective catalyst reduction device 13c and the vehicle cover 9a. The urea aqueous solution pipe 14a extends between the base part 16a and the vehicle cover 9a. Thus, radiant heat radiating toward the urea aqueous solution pipe 14a from the selective catalyst reduction device 13c can be blocked and consequently the urea aqueous solution flowing inside the urea aqueous solution pipe 14a can be prevented from changing to ammonia. Further, radiant heat radiating toward the vehicle cover 9a from the selective catalyst reduction device 13c can be blocked and consequently damage to the coating of the vehicle cover 9a can be prevented. The urea aqueous solution pipe 14a is supported by a plurality of mounting brackets 6c. The urea aqueous solution pipe 14a is supported by the mounting brackets 6c to maintain a certain distance from the first partition plate 16. The mounting brackets 6c extend upward from the rear frame 6 and are slanted in a direction away from the first partition plate 16. The mounting brackets 6c are disposed a certain distance away from each other in the front-back direction.

The peripheral wall part 16b of the first partition plate 16 extends from the rear edge of the base part 16a toward the left side and covers the injection device 14 from the front thereof to the top of the injection device 14 so as to face the injection device 14. That is, the peripheral wall part 16b has a second partition part 16b1 that is a portion disposed between the injection device 14 and the selective catalyst reduction device 13c, and a third partition part 16b2 that is a portion disposed between the injection device 14 and the top plate 9c. The peripheral wall part 16b extends from the base part 16a to near the right side surface of the connecting pipe 13b. The peripheral wall part 16b also extends substantially along the contour of the right side surface of the connecting pipe 13b. As a result, the left side, the front side, and the top of the injection device 14 can be covered by the peripheral wall part 16b and the right side surface of the connecting pipe 13b.

The second partition plate 17 has a base part 17a and a peripheral wall part (example of a first partition part) 17b, and is fixed to the vehicle cover 9a using bolts and the like. The vehicle cover 9a is divided into a plurality of portions and each of the portions can be opened and closed independently in order to facilitate access to the inside parts (engine room 9 and cooling room 10) of the rear vehicle body 3b. The portion of the vehicle cover 9a supporting the second partition plate 17 is fixed to the rear frame 6 via a hinge at the front edge part of the engine room and can be opened and closed around the hinge (see FIG. 7). Maintenance of the injection device 14 and the like is facilitated since the second partition plate 17 is also pulled away when the vehicle cover 9a is opened. The second partition plate 17 has heat shielding properties and is formed, for example, by a steel plate treated with a heat resistant coating.

The base part 17a of the second partition plate 17 is a plate that extends in the front-back direction from near the injection device 14 to the rear edge part of the engine room 9, and has a rectangular shape. The front edge of the base part 17a is located to the rear of the injection device 14. The base part 17a is disposed between the diesel particulate filtering device 13a and the vehicle cover 9a. As a result, radiant heat radiating toward the vehicle cover 9a from the diesel particulate filtering device 13a can be blocked and consequently damage to the coating of the vehicle cover 9a can be prevented.

The peripheral wall part 17b of the second partition plate 17 extends from the front edge of the base part 17a toward the left side and covers the injection device 14 from the rear thereof so as to face the injection device 14. That is, the peripheral wall part 17b is disposed between the injection device 14 and an exhaust gas outlet 13h of the diesel particulate filtering device 13a. The peripheral wall part 17b extends from the base part 17a to near the right side surface of the connecting pipe 13b.

As described above, the injection device 14 is disposed in an accommodating space S defined by the peripheral wall part 16b of the first partition plate 16, the peripheral wall part 17b of the second partition plate 17, the vehicle cover 9a, and the connecting pipe 13b.

As illustrated in FIG. 2, the cooling room 10 is disposed to the rear of the engine room 9, and the cooling unit 18 is accommodated inside the cooling room 10. The cooling unit 18 is a unit for reducing the temperature of liquids or gases flowing inside the cooling unit 18, and may be exemplified by a condenser or a radiator and the like. The cooling room 10 has a front plane defined by the partition wall 9b, side planes defined by the vehicle cover 9a, and a rear plane defined by a grille 21. Further, the upper plane of the cooling room 10 is defined by the top plate 9c. Air inside the cooling room 10 is exhausted to the outside in the rear through an opening part of the grille 21 due to the cooling fan 11 being rotated.

Figure 6:
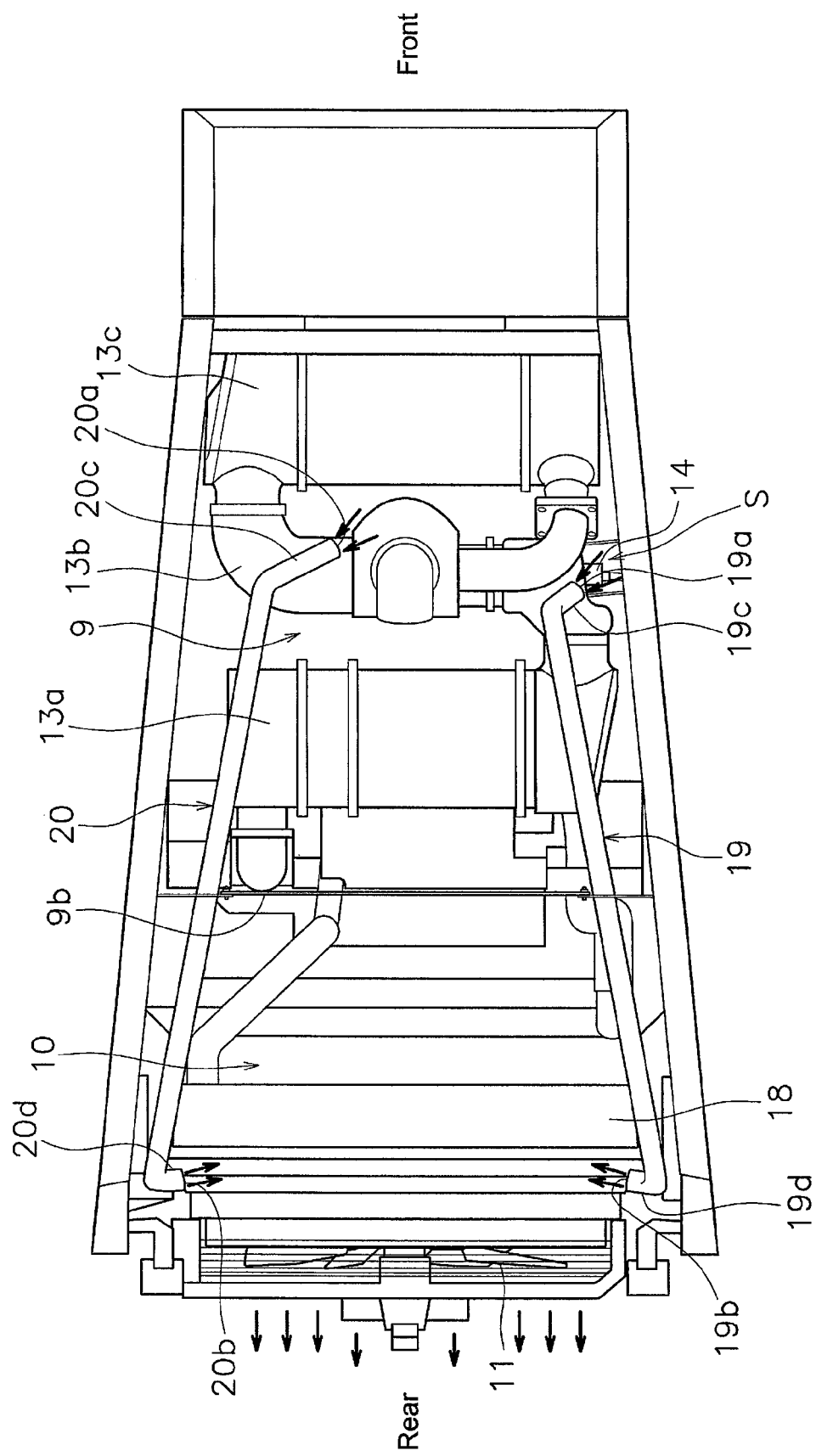
FIG. 6 is a plan view of the rear vehicle body when the top plate is removed.

FIG. 6 is a plan view of the rear vehicle body 3b when the top plate 9c is removed. As illustrated in FIG. 6, a first exhaust pipe 19 and a second exhaust pipe 20 are disposed so as to straddle the engine room 9 and the cooling room 10. The first exhaust pipe 19 is a substantially linear pipe having one end 19a and another end 19b. The one end 19a of the first exhaust pipe 19 is located in the engine room 9, and the another end 19b of the first exhaust pipe 19 is located in the cooling room 10. The first exhaust pipe 19 passes through the partition wall 9b to extend in the front-back direction on the right side and above the engine room 9 and the cooling room 10.

Specifically, the one end 19a of the first exhaust pipe 19 is located near the injection device 14. One end part 19c that includes the one end 19a of the first exhaust pipe 19 bends toward the outside. Consequently, the one end 19a of the first exhaust pipe 19 is disposed to face the accommodating space S that accommodates the injection device 14. The one end 19a of the first exhaust pipe 19 is located near enough to the injection device 14 to allow air inside the accommodating space S to be sucked in. Specifically, the one end 19a is preferably located above an attachment part of the injection device 14 to the connecting pipe 13b, or more preferably the one end 19a is located inside the accommodating space S.

The another end 19b of the first exhaust pipe 19 is located between the cooling fan 11 and the cooling unit 18. Another end part 19d that includes the another end 19b of the first exhaust pipe 19 bends downward and to the inside so that the another end 19b of the first exhaust pipe 19 is located between the cooling fan 11 and the cooling unit 18. The cooling fan 11 produces an air flow toward the rear. Specifically, the cooling fan 11 sucks in air from the front side (one side) of the cooling fan 11 and exhausts air from the rear side (another side) of the cooling fan 11. Since the cooling unit 18 is disposed on the front side of the cooling fan 11, negative pressure occurs between the cooling fan 11 and the cooling unit 18. As a result, when the cooling fan 11 is operating, the first exhaust pipe 19 acts to suck in air from the one end 19a and exhaust air from the another end 19b. Specifically, the first exhaust pipe 19 sucks in the air from the accommodating space S and exhausts the air to the outside through the cooling fan 11.

The second exhaust pipe 20 is a substantially linear pipe having one end 20a and another end 20b. The one end 20a of the second exhaust pipe 20 is located in the engine room 9, and the another end 20b of the second exhaust pipe 20 is located in the cooling room 10. The second exhaust pipe 20 passes through the partition wall 9b to extend in the front-back direction on the left side and above the engine room 9 and the cooling room 10.

The one end 20a of the second exhaust pipe 20 is disposed above the connecting pipe 13b. The one end 20a of the second exhaust pipe 20 is disposed between the diesel particulate filtering device 13a and the selective catalyst reduction device 13c in the plane view. One end part 20c that includes the one end 20a of the second exhaust pipe 20 bends toward the inside. Consequently, the one end 20a of the second exhaust pipe 20 is located near the center in the vehicle width direction.

The another end 20b of the second exhaust pipe 20 is located between the cooling fan 11 and the cooling unit 18. Another end part 20d that includes the another end 20b of the second exhaust pipe 20 bends downward and to the inside so that the another end 20b of the second exhaust pipe 20 is located between the cooling fan 11 and the cooling unit 18. Since negative pressure occurs between the cooling fan 11 and the cooling unit 18 as described above, the second exhaust pipe 20 sucks in air from the one end 20a and exhausts air from the another end 20b.

Figure 7:
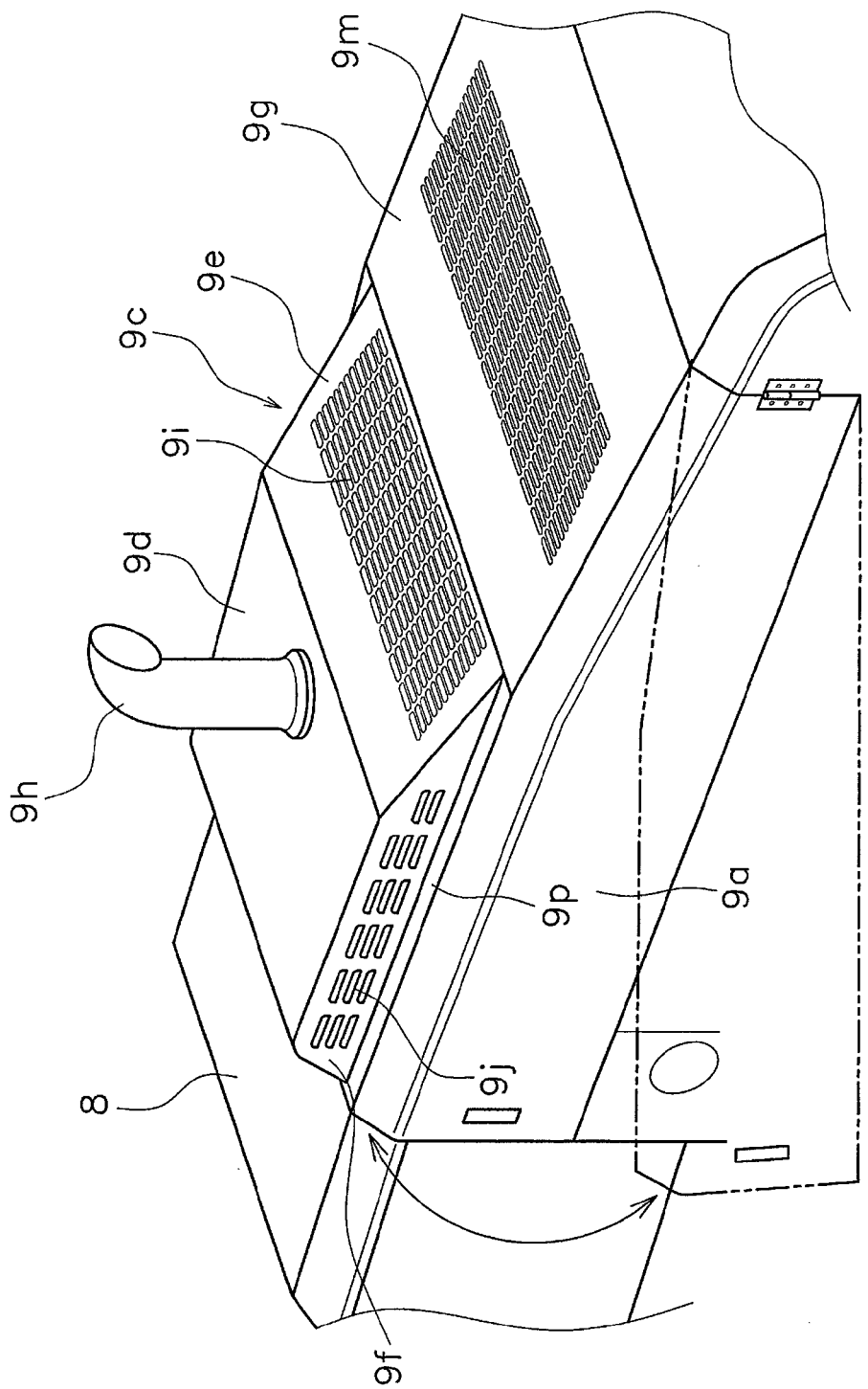
FIG. 7 is a perspective view of the top plate as seen from the left rear.

FIG. 7 is a perspective view of the top plate 9c as seen from the left rear. As illustrated in FIG. 7, the top plate 9c is fixed in a removable manner with screws and the like to the upper end part of the vehicle cover 9a. The top plate 9c is a plate-like member having a front part that projects upward, and includes a flat part 9d, a first sloping part 9e (example of a sloping part), a pair of side wall parts 9f, a front wall part 9n (see FIG. 2), and a second sloping part 9g.

The flat part 9d is rectangular, extends substantially horizontally, and defines the front part upper plane of the engine room 9. An exhaust pipe 9h extends upward from the flat part 9d. The exhaust pipe 9h is a pipe for exhausting the exhaust gas that has been processed from the exhaust gas post-processing device 13 to the outside. As illustrated in FIG. 2, the front wall part 9n extends from the front edge of the flat part 9d downward toward the vehicle cover 9a.

As illustrated in FIG. 7, the first sloping part 9e extends to the rear from the rear edge of the flat part 9d, and the height decreases towards the rear. The first sloping part 9e has the same width as the flat part 9d and defines the rear part upper plane of the engine room 9. The first sloping part 9e has a first ventilation part 9i made up of a plurality of through-holes. Air inside the engine room 9 is exhausted to the outside, and outside air is sucked into the engine room 9 through the first ventilation part 9i. The through-holes that constitute the first ventilation part 9i have a slit shape.

The pair of side wall parts 9f extends downward from both edges of the flat part 9d and the first sloping part 9e toward the vehicle cover 9a. The side wall parts 9f each have a flange part 9p at the lower edges. The side wall parts 9f each have a second ventilation part 9j made up of a plurality of through-holes. Air inside the engine room 9 is exhausted to the outside, and outside air is sucked into the engine room 9 through the second ventilation parts 9j. The through-holes that constitute the second ventilation parts 9j have a slit shape.

Figure 8:
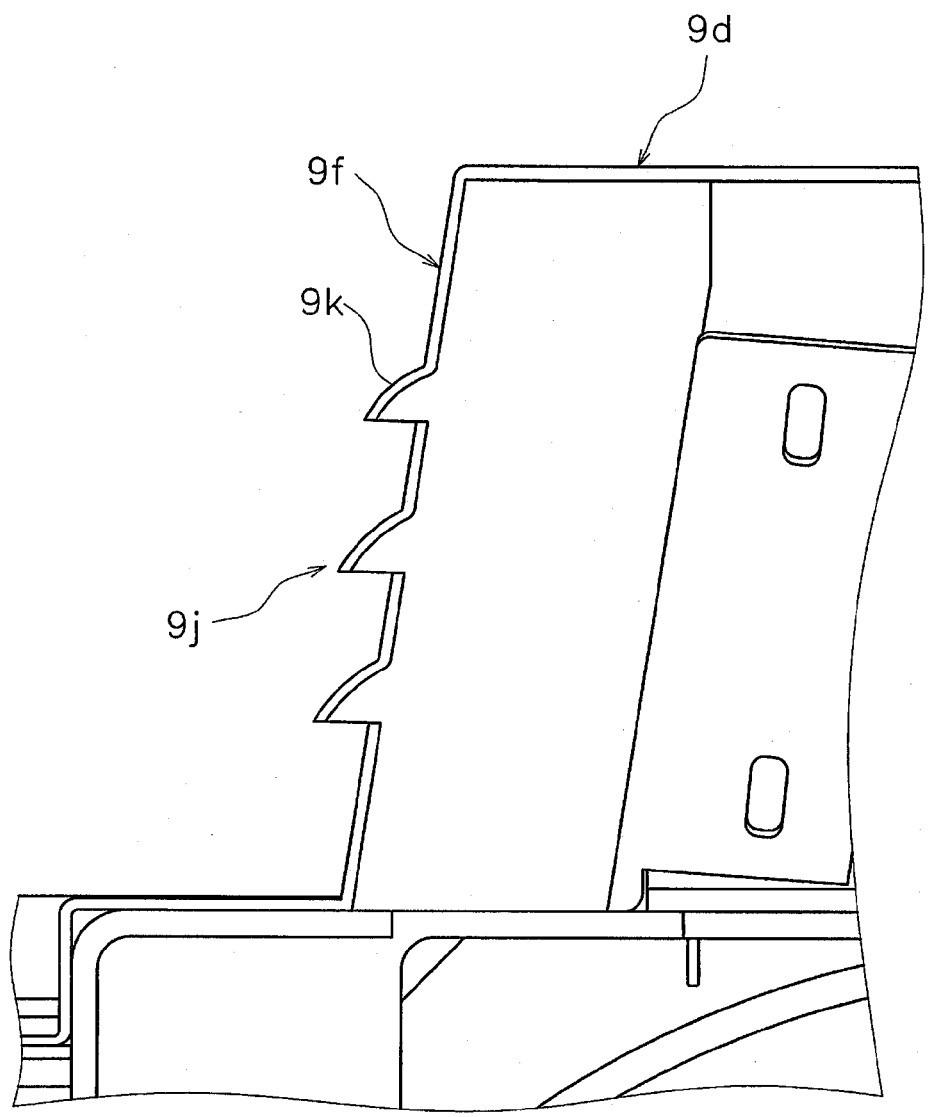
FIG. 8 is a cross-section of the left side of the top plate as seen from the rear.

FIG. 8 is a cross-section of the left side of the side wall part 9f as seen from the rear. As illustrated in FIG. 8, the through-holes that constitute the second ventilation parts 9j each have an eave part 9k at the upper part. By providing each of the through-holes with the eave part 9k at the upper part since the side wall parts 9f substantially extend vertically, liquid such as rainwater can be prevented from entering the engine room 9.

As illustrated in FIG. 7, a projecting part at the front of the top plate 9c is configured by the abovementioned flat part 9d, the first sloping part 9e, the pair of side wall parts 9f, and the front wall part 9n. The capacity of the engine room 9 is increased by the amount of the space enclosed by the flat part 9d, the first sloping part 9e, the pair of side wall parts 9f and the front wall part 9n.

The second sloping part 9g extends to the rear from the rear edges of the first sloping part 9e and the flange parts 9p. The height of the vehicle cover 9a decreases toward the rear, and the second sloping part 9g slopes along the upper edge of the rear part of the vehicle cover 9a. Specifically, the height of the second sloping part 9g decreases toward the rear. The slope of the second sloping part 9g is gentler than the slope of the first sloping part 9e.

The second sloping part 9g mainly defines an upper plane of the cooling room 10, and partially defines the rear part upper plane of the engine room 9. The second sloping part 9g has an intake part 9m made up of a plurality of through-holes. When the cooling fan 11 is operating, air inside the cooling room 10 is exhausted to the outside through an opening part of the grille 21, and outside air is sucked into the cooling room 10 through the intake part 9m. Further, air from the outside flows into the cooling room 10 through an intake part 9q formed in the vehicle cover 9a.

Figure 9:
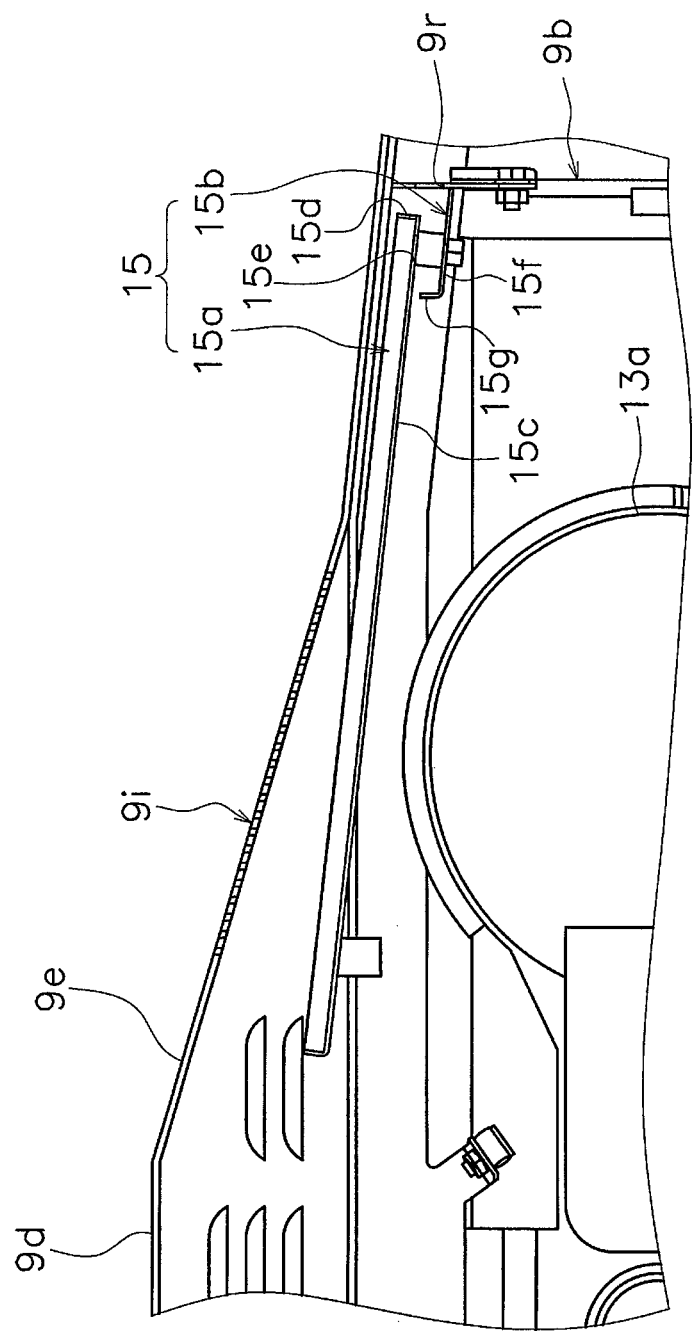
FIG. 9 is a side cross-section of a drainage mechanism as seen from the left side.

FIG. 9 is a side cross-section of a drainage mechanism 15 disposed inside the rear vehicle body 3b as seen from the left side. To facilitate explanation, the description of the first exhaust pipe 19 is omitted in FIG. 9. As illustrated in FIG. 9, the drainage mechanism 15 is disposed inside the engine room 9. The drainage mechanism 15 includes a receptacle member 15a and a water conveyance member 15b.

The receptacle member 15a is disposed below the first ventilation part 9i of the first sloping part 9e, and is a tray-like member that receives rainwater and the like that enters the engine room 9 from the first ventilation part 9i. The receptacle member 15a has a rectangular bottom plate 15c and a side plate 15d that extend upward from the outer edges of the bottom plate 15c. The width of the receptacle member 15a is the same or greater than the width of the first ventilation part 9i so as to be able to receive all the rainwater entering through the first ventilation part 9i, and is preferably approximately the same width as the engine room 9. The front edge of the receptacle member 15a is located at the front edge of the first ventilation part 9i or located further forward than the front edge of the first ventilation part 9i. The rear edge of the receptacle member 15a is located at the rear edge of the first ventilation part 9i or further to the rear of the rear edge of the first ventilation part 9i, and is preferably located near the partition wall 9b. The bottom plate 15c is disposed in a sloped manner so that the height of the bottom plate 15c is lower further toward the rear in order to allow the rainwater received by the receptacle member 15a to flow toward the rear.

Figure 10:
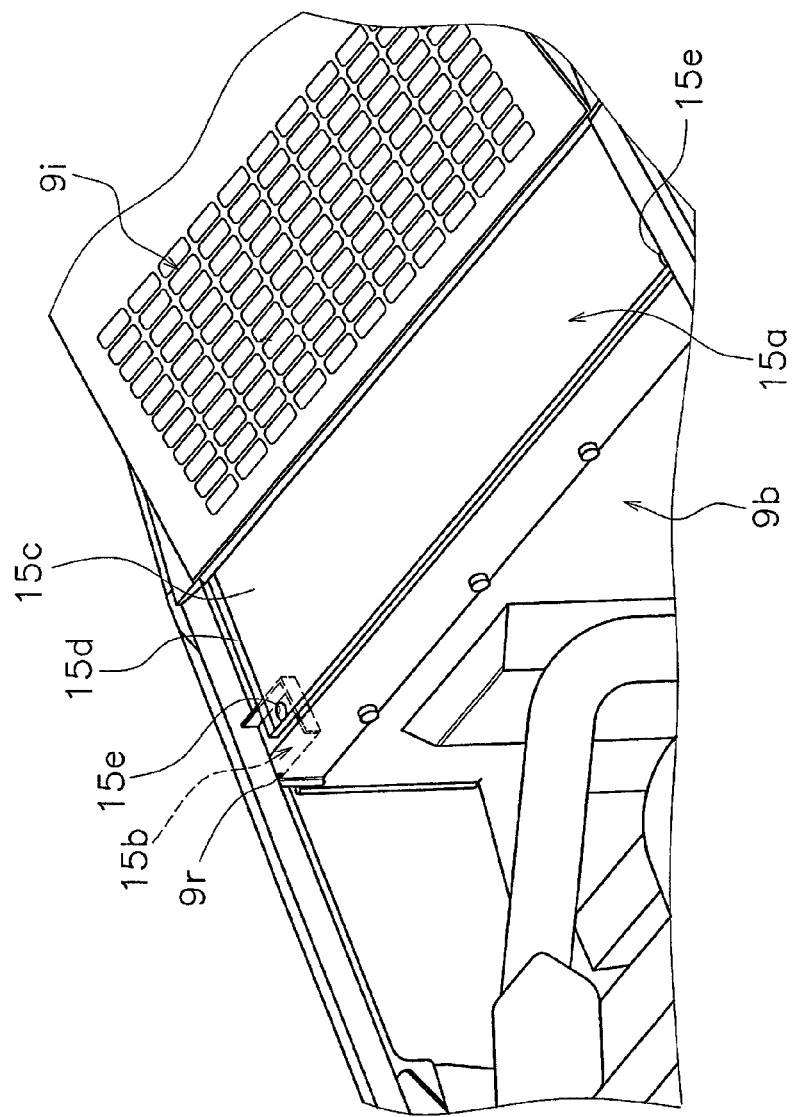
FIG. 10 is a perspective view of the drainage mechanism as seen from the right rear.
Figure 11:
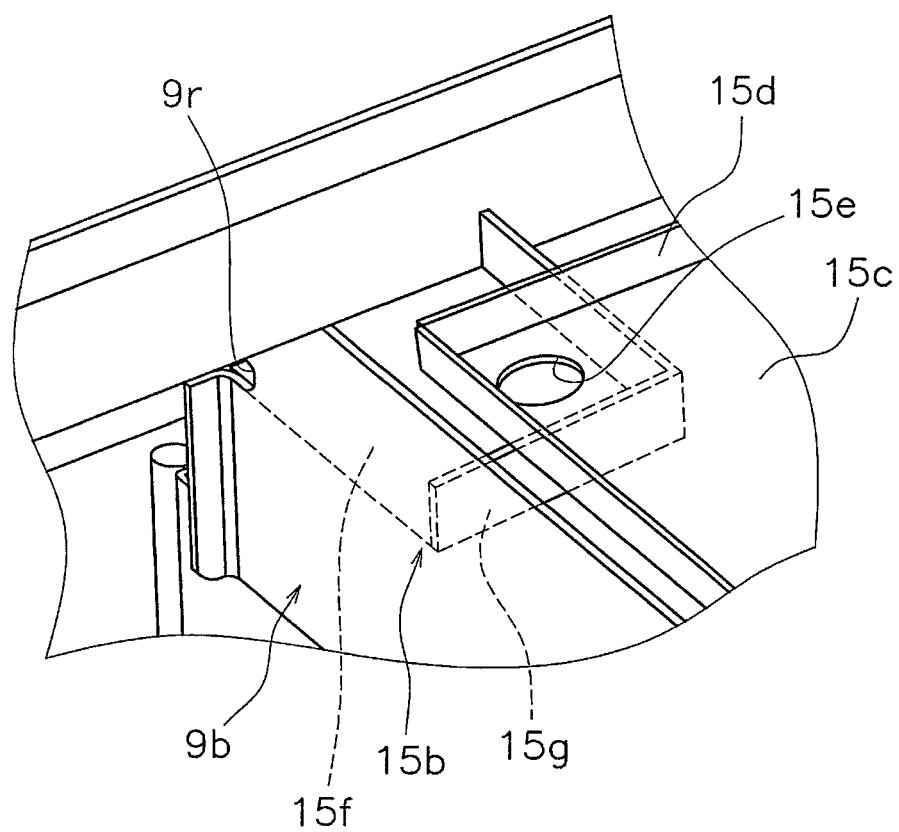
FIG. 11 is a perspective view of a water conveyance member disposed on the left side as seen from the right rear.

FIG. 10 is a perspective view of the drainage mechanism 15 as seen from the right rear, and FIG. 11 is a perspective view of the water conveyance member 15b disposed on the left side as seen from the right rear. To facilitate explanation, the description of the second sloping part 9g on the top plate 9c, and the first and second exhaust pipes 19 and 20 are omitted in FIGS. 10 and 11. As illustrated in FIG. 10, the bottom plate 15c of the receptacle member 15a has through-holes 15e at a left rear edge part and at a right rear edge part. The water conveyance members 15b are disposed below each of the through-holes 15e. The water conveyance member 15b disposed on the left side of the engine room 9 and the water conveyance member 15b disposed on the right side of the engine room 9 have symmetrical shapes relative to the center in the vehicle width direction, and therefore only an explanation of the water conveyance member 15b disposed on the left side will be provided hereinbelow.

The water conveyance member 15b is a member that guides rainwater that drips from the through-holes 15e of the receptacle member 15a to the outside of the engine room 9. As illustrated in FIGS. 9 and 11, the water conveyance member 15b has a bottom plate 15f and a side plate 15g. The bottom plate 15f is rectangular, and the left edge of the bottom plate 15f is fitted to the vehicle cover 9a, and the rear edge of the bottom plate 15f is fitted to the partition wall 9b. The side plate 15g extend upward from the front edge and the right edge of the bottom plate 15f. Specifically, the water conveyance member 15b is a vessel-shaped member that is open at the upper plane, and the lower plane is defined by the bottom plate 15f and the side planes are defined by the side plate 15g, the vehicle cover 9a, and the partition wall 9b.

The partition wall 9b is a plate-like member for separating the engine room 9 and the cooling room 10, and has notch-like water drainage outlets 9r at a right upper edge part and at a left upper edge part. The upper edge of each water drainage outlet 9r is located higher than the bottom plate 15f of the water conveyance member 15b, and the bottom edge of each water drainage outlet 9r is located lower than the upper edge of the side plates 15g. The water conveyance member 15b is disposed in a sloped manner so that the height of the bottom plate 15f is lower further toward the rear in order to allow the rainwater received by the receptacle member 15a to flow to the rear. As a result, the rainwater that drips off of the receptacle member 15a into the water conveyance members 15b flows toward the rear and is discharged through the water drainage outlets 9r of the partition wall 9b toward the cooling room 10.

The receptacle member 15a is located below the first sloping part 9e as illustrated in FIG. 2. The receptacle member 15a is located above the diesel particulate filtering device 13a. The receptacle member 15a has heat insulation properties. For example, the receptacle member 15a may be formed of a steel plate treated with a heat insulating coating, may be formed of aluminum, an aluminum alloy, or stainless steel, or may be coated with a coating including aluminum, an aluminum alloy, or stainless steel. The transmission of radiant heat from the diesel particulate filtering device 13a to the top plate 9c can be suppressed by the receptacle member 15a that is disposed between the diesel particulate filtering device 13a and the top plate 9c. In this way, the receptacle member 15a functions as a heat insulating plate.

Characteristics

The wheel loader 1 according to the present embodiment has the following characteristics.

(1) The another end 19b of the first exhaust pipe 19 is located between the cooling unit 18 and the cooling fan 11 which is a region of negative pressure when the cooling fan 11 is operating. As a result, the first exhaust pipe 19 acts to suck in the air around the injection device 14 from the one end 19a and to exhaust the air from the another end 19b. Consequently, the area around the injection device 14 in the engine room 9 has negative pressure, and the air taken in from outside of the engine room 9, for example, through the first and second ventilation parts 9i and 9j of the top plate 9c flows around the injection device 14. As a result, the injection device 14 is cooled by the cooling air that flows from the outside toward the one end 19a of the first exhaust pipe 19.

(2) The front and rear of the injection device 14 is covered by the respective peripheral wall parts 16b and 17b of the first and second partition plates 16 and 17. As a result, the one end 19a of the first exhaust pipe 19 is able to effectively suck in air around the injection device 14 and accordingly is able to further cool the injection device 14. Furthermore, since the second partition part 16b1 of the peripheral wall part 16b of the first partition plate 16 is disposed between the injection device 14 and the selective catalyst reduction device 13c, radiant heat radiating from the selective catalyst reduction device 13c to the injection device 14 can be blocked. Accordingly, a rise in the temperature of the injection device 14 due to radiant heat from the selective catalyst reduction device 13c can be prevented. Further, since the peripheral wall part 17b of the second partition plate 17 is disposed between the injection device 14 and the diesel particulate filtering device 13a, radiant heat radiating from the diesel particulate filtering device 13a to the injection device 14 can be blocked. According to this configuration, a rise in the temperature of the injection device 14 due to radiant heat from the diesel particulate filtering device 13a can be prevented.

(3) The injection device 14 is disposed between the connecting pipe 13b and the vehicle cover 9a. As a result, the area around the injection device 14 is covered by the connecting pipe 13b and the vehicle cover 9a in addition to the above-mentioned respective peripheral wall parts 16b and 17b of the first and second partition plates 16 and 17. Consequently, the first exhaust pipe 19 is able to suck the air around the injection device 14 from the one end 19a more effectively to allow for more cooling of the injection device 14.

(4) The another end 20b of the second exhaust pipe 20 is located between the cooling unit 18 and the cooling fan 11 which is a region of negative pressure when the cooling fan 11 is operating. As a result, the second exhaust pipe 20 acts to suck in air inside the engine room 9 from the one end 20a and exhaust the air from the another end 20b. Consequently, hot air inside the engine room 9 can be exhausted to the outside.

(5) The front, the rear, and the top of the injection device 14 is covered by the respective peripheral wall parts 16b and 17b of the first and second partition plates 16 and 17. Consequently, the first exhaust pipe 19 is able to suck in the air around the injection device 14 from the one end 19a more effectively to allow for more cooling of the injection device 14.

(6) Since mainly the rear part of the top plate 9c of the engine room 9 is provided with the sloping part 9e in which the height decreases toward the rear, the visibility to the rear can be assured even though the top plate 9c of the engine room 9 is high. Since the first ventilation part 9i is formed in the sloping part 9e, the occupied surface area of the first ventilation part 9i can be made wider than if the first ventilation part 9i is formed in a horizontal portion, and the intrusion of rainwater can be suppressed.

(7) The capacity of the engine room 9 is increased by the amount in which the front part of the top plate 9c projects upward.

(8) Since the top plate 9c has the second ventilation part 9j in addition to the first ventilation part 9i, air is able to flow more smoothly between the inside and the outside of the engine room 9. As a result, the injection device 14 can be cooled more effectively.

(9) Since the second ventilation part 9j has the eave parts 9k, the intrusion of rainwater through the second ventilation part 9j into the engine room 9 can be suppressed.

MODIFIED EXAMPLES

While an embodiment of the present invention has been described above, the present invention is not limited to the embodiment and many variations and modifications can be made within the spirit of the present invention.

Modified Example 1

While the partitioning member is configured of two partition plates being the first partition plate 16 and the second partition plate 17 in the above embodiment, the number of partition plates that configure the partitioning member is not limited as such and the partitioning member may be configured of one partition plate or may be configured of three or more partition plates. Specifically, the injection device 14 may be covered by one partition plate or may be covered by three or more partition plates. The first and second partition plates 16 and 17 that constitute the partitioning member may be omitted.

Modified Example 2

The front, rear and the top of the injection device 14 is covered by, but not limited to, the respective peripheral wall parts 16b and 17b of the first and second partition plates 16 and 17 in the above embodiment. For example, the front, the rear, the top, and the bottom of the injection device 14 may be covered by the respective peripheral wall parts 16b and 17b of the first and second partition plates 16 and 17, and further the right side of the injection device 14 may also be covered.

Modified Example 3

While two pipes constituted by the first exhaust pipe 19 and the second exhaust pipe 20 are installed in the above embodiment, the second exhaust pipe 20 may be omitted and only the first exhaust pipe 19 may be installed.

Modified Example 4

While the first and second ventilation parts 9i and 9j are formed in the top plate 9c to bring in outside air into the engine room 9 in the above embodiment, the present invention is not limited as such. For example, a ventilation part may be formed in the vehicle cover 9a that defines the side surface of the engine room 9 instead of being formed in the top plate 9c. In this case, forming the ventilation part in a region of the vehicle cover 9a facing the injection device 14 is desired from the point of view of effectively cooling the injection device 14.

Modified Example 5

While an example of a wheel loader has been explained in the above embodiment, the present invention may be applicable to another work vehicle.

The invention claimed is:

1. A work vehicle comprising:
an engine;
an exhaust gas post-processing device including a diesel particulate filtering device, a selective catalyst reduction device, a connecting pipe connecting the diesel particulate filtering device and the selective catalyst reduction device, and an injection device configured and arranged to inject a reducing agent into the connecting pipe;
an engine room accommodating the engine and the exhaust gas post-processing device;
a cooling fan configured and arranged to suck in air from one side and to exhaust air from another side to produce an air flow;
a cooling unit disposed on the one side of the cooling fan;
a first exhaust pipe having one end configured and arranged to suck in air around the injection device and another end located between the cooling fan and the cooling unit;
a top plate defining an upper plane of the engine room;
a cooling room disposed to the rear of the engine room and accommodating the cooling unit;
a partition wall separating the engine room and the cooling room; and
a partitioning member including a first partition part disposed between the infection device and the diesel particulate filtering device, and a second partition part disposed between the injection device and the selective catalyst reduction device;
wherein the exhaust gas post-processing device is disposed above the engine, and the top plate has a first ventilation part including a plurality of through-holes communicating the engine room with an outside.

2. The work according to claim 1, wherein
the one end of the first exhaust pipe is located above an attachment part of the injection device to the connecting pipe.

3. The work vehicle according to claim 1, wherein
the one end of the first exhaust pipe is located in an accommodating space defined by the first partition part and the second partition part.

4. The work vehicle according to claim 1, further comprising
a second exhaust pipe having one end located above the connecting pipe inside the engine room and another end located between the cooling fan and the cooling unit.

5. The work vehicle according to claim 1, wherein
the connecting pipe is disposed so that a longitudinal direction thereof is aligned in a vehicle width direction, and
the injection device is disposed on a first side of the connecting pipe as seen from a rear of the work vehicle.
6. The work vehicle according to claim 5, wherein
the injection device is configured and arranged to inject the reducing agent at an upstream side of the exhaust gas flowing inside the connecting pipe.
7. The work vehicle according to claim 5, wherein
the diesel particulate filtering device and the selective catalyst reduction device are disposed with longitudinal directions thereof aligned in the vehicle width direction.
8. The work vehicle according to claim 1, wherein
the injection device is disposed between the diesel particulate filtering device and the selective catalyst reduction device in a front-back direction of the work vehicle; and
the partitioning member includes a third partition part disposed above the injection device.
9. The work vehicle according to claim 1, wherein
the top plate further has a sloping part having a height that decreases toward a rear of the work vehicle; and
the first ventilation part is formed in the sloping part.
10. The work vehicle according to claim 9, wherein
the sloping part of the top plate defines a rear part upper plane of the engine room, and
the top plate further includes a flat part extending horizontally to a front of the work vehicle from a front edge of the sloping part, the flat part defining a front part upper plane of the engine room.
11. The work vehicle according to claim 10, wherein
the top plate further includes a pair of side wall parts extending downward from both side edges of the flat part and the sloping part, and
each of the side wall parts includes a second ventilation part including a plurality of through-holes.
12. The work vehicle according to claim 11, wherein
each of the through-holes of the second ventilation part has an eave part.
13. A wheel loader comprising:
an engine;
an exhaust gas post-processing device including a diesel particulate filtering device, a selective catalyst reduction device, a connecting pipe connecting the diesel particulate filtering device and the selective catalyst reduction device, and an injection device configured and arranged to inject a reducing agent into the connecting pipe;
an engine room accommodating the engine and the exhaust gas post-processing device;
a cooling room disposed to the rear of the engine room and accommodating a cooling unit;
a partition wall separating the engine room and the cooling room;
a partitioning member including a first partition part disposed between the injection device and the diesel particulate filtering device, and a second partition part disposed between the injection device and the selective catalyst reduction device;
a cooling fan disposed to the rear of the cooling unit in the cooling room and configured and arranged to exhaust air inside the cooling room to the rear;
a first exhaust pipe having one end configured and arranged to suck in air around the injection device and another end displaced between the cooling fan and the cooling unit; and
a top plate defining an upper plane of the engine room;
wherein the exhaust gas post-processing device is disposed above the engine, and the top plate has a first ventilation part including a plurality of through-holes communicating the engine room with an outside.
14. A work vehicle comprising:
an engine;
an exhaust gas post-processing device including a diesel particulate filtering device, a selective catalyst reduction device, a connecting pipe connecting the diesel particulate filtering device and the selective catalyst reduction device, and an injection device configured and arranged to inject a reducing agent into the connecting pipe;
an engine room accommodating the engine and the exhaust gas post-processing device;
a cooling fan configured and arranged to suck in air from one side and to exhaust air from another side to produce an air flow;
a cooling unit disposed on the one side of the cooling fan;
a first exhaust pipe having one end configured and arranged to suck in air around the injection device and another end located between the cooling fan and the cooling unit;
a top plate defining an upper plane of the engine room, the top plate including a sloping part having a height that decreases toward a rear of the work vehicle and a flat part extending horizontally to a front of the work vehicle from a front edge of the sloping part, the sloping part defining a rear part upper plane of the engine room and the flat part defining a front part upper plane of the engine room;
a cooling room disposed to the rear of the engine room and accommodating the cooling unit;
a partition wall separating the engine room and the cooling room;
wherein the exhaust gas post-processing device is disposed above the engine, and the top plate has a first ventilation part formed in the sloping part and including a plurality of through-holes communicating the engine room with an outside.
15. The work vehicle according to claim 14, wherein
the top plate further includes a pair of side wall parts extending downward from both side edges of the flat part and the sloping part, and
each of the side wall parts includes a second ventilation part including a plurality of through-holes.
16. The work vehicle according to claim 15, wherein each of the through-holes of the second ventilation part has an eave part.

* * * * *